Aug. 9, 1932.  J. L. HODGSON  1,870,849
FLOW QUANTITY METER
Filed June 9, 1928   5 Sheets-Sheet 1

INVENTOR.
John L. Hodgson
BY Thomas A. Jenckes Jr.
ATTORNEY

Aug. 9, 1932.  J. L. HODGSON  1,870,849
FLOW QUANTITY METER
Filed June 9, 1928  5 Sheets-Sheet 2

INVENTOR.
John L. Hodgson.
BY Thomas A. Jenkes Jr.
ATTORNEY

Aug. 9, 1932.  J. L. HODGSON  1,870,849
FLOW QUANTITY METER
Filed June 9, 1928    5 Sheets-Sheet 3

INVENTOR.
John L. Hodgson
BY Thomas A. Jenkes Jr.
ATTORNEY.

Aug. 9, 1932.  J. L. HODGSON  1,870,849
FLOW QUANTITY METER
Filed June 9, 1928   5 Sheets-Sheet 5

INVENTOR.
John L. Hodgson
BY Thomas A. Jenckes Jr.
ATTORNEYS.

Patented Aug. 9, 1932

1,870,849

UNITED STATES PATENT OFFICE

JOHN LAWRENCE HODGSON, OF NEAR LEIGHTON, BUZZARD, ENGLAND

FLOW QUANTITY METER

Application filed June 9, 1928. Serial No. 284,094.

My invention relates to improvements in rotary meters and particularly to quantity of flow meters.

An object of my invention is to provide a standardized differential responsive mechanism unit for use in quantity of flow meters, whereby the size of the differential producing means required for any given flow conditions in the meter may be readily calculated and whereby the desired ratio of gearing for any given flow conditions between the differential responsive mechanism and an indicating mechanism may also be readily calculated. My invention therefore makes possible, I believe for the first time, a quantity of flow meter of this type which may be installed directly without the necessity of calibrating it individually by test in use.

To be commercially practical, a rate meter requires a differential producing means, a differential responsive means and a scale which may be used with these two means without requiring a special calibration for each individual installation, but which may be calculated and made with only a knowledge of the flow conditions and the characteristics of the particular differential producing means used. For many years the characteristics of the differential responsive means have depended primarily on two extremely constant and reproduceable factors: the densities of the manometeric liquids used (usually mercury 13.57 sp. gr. and water 1.000 sp. gr.) and the accelerating force of gravity (32.16 feet per second per second) which are satisfactorily constant for all commercial metering, each value being known definitely to four significant figures. The usefulness of this type of meter has come almost entirely from this consequently definite and reproduceable differential responsive U-tube manometer which permitted a meter to be used with confidence without special and individual calibration.

No commercially useful quantity meter for gases and vapors based on a differential producing and differential responsive type has been heretofore produced since there was no reproduceable rotatable element for use in the differential responsive portion thereof in existence having a known reproduceable relationship between rate of revolutions and differential. It has required over five years of development, standardization, research and inventive effort to create this new article of commerce and its invention makes possible for the first time the use of a meter capable of indicating quantities directly when only the differential producer's characteristics and the fluid conditions are known; it being only necessary to use proper gearing and replaceable differential producing means which may be computed without the combined meters requiring special and individual calibration.

In order to provide a standardized differential responsive mechanism, I preferably provide a standard rotatable element actuated by the differential and damp the rotation thereof to cause said rotatable element to rotate in a standardized known relation to the differential produced by the flow through the meter. The standardized damped rotatable element acts similarly to a manometer in that there is a definite relationship between the differential "D" and the rate of revolutions "R", the ratio of $\sqrt{D}/R$ being constant regardless of changes in fluid and line conditions.

The total number of revolutions is therefore proportional to the total quantity passing through the line at any given density and this thus makes possible an ideal quantity meter. Moreover, when a graphic record of the rate is also required, a complete meter giving both rate and total quantity is obtained by adding a rate of flow manometer. The standard damped rotatable mechanism may be used in practically any size main and with any size orifice without modification.

It is apparent that since the quantity of flow corresponds to the number of rotor revolutions for the same period of time a revolution counter attached to this with proper gearing will indicate the quantity of flow directly and that it requires only simple calculation of the gearing from the usual differential rate of flow meter formula instead of an expensive calibration for each meter.

The validity of this very desirable method, which has been universally accepted for rate meters, depends entirely upon the absolute standardization of both rotor and damping means.

I preferably provide a standardized differential responsive mechanism consisting of a turbine rotor adapted to be mounted in a conduit having a damping chamber attached thereto and, if desired, nozzle or other means to direct the desired amount of flow against the turbine blades. The entire flow may if desired, be directed through the portion of the device containing the turbine. In my preferred embodiment, however, as shown in the drawing, I preferably locate the turbine in a shunt line and locate an obstruction of the desired size depending on the flow conditions in the main line to create a suitable pressure differential therein between the terminals of the shunt line to rotate the turbine in the desired manner. This differential creates streams having velocity in the nozzles which impinge on the turbine and thus produce the desired impact forces on the turbine rotor. In addition to the standard differential responsive means which I preferably employ, my improved meter is provided with means to transmit the movement of the turbine shaft to a corresponding movement of an indicating means, which in my preferred embodiment comprises a magnetic clutch so that it is not necessary to break into the interior of the damping chamber casing for connecting the control mechanism thereto, thus avoiding the use of a stuffing box. I preferably employ a standardized differential responsive mechanism which may be used with any size conduit varying from 1" to 10". Where a conduit of over 10" is employed, the entire metering unit is preferably connected in shunt to the main line and an orifice of the desired size is positioned in the main line between the terminals of said shunt connection and with the main line in the metering device completely closed, the true differential acts without appreciable flow through the shunt line, this slight flow being only that which goes through the nozzles. The nozzles and the rotor must not only be exactly reproduceable, but also have certain shapes as otherwise the relation between differential and revolutions is not constant for all differentials but changes seriously at high differentials. Similarly, the shape and roughness of the damping means must not only be exactly reproduceable but also must have certain characteristics as otherwise the damping force does not vary exactly as the square of the rate of revolution; this being essential for the rate of revolution to correspond accurately to the square root of the differential. Further, relatively great damping must be used so that the velocity of the rotor blade will be negligible as compared to fluid velocity from the nozzles in order to produce true impact forces which act on the rotor blades similarly to pressures acting on a manometer, the rotor speed thus depending on the differential instead of merely on the velocity. In order to achieve the above desired result, a standardized damped rotor having a known reproduceable relation between rotor speed and differential has been developed at the expense of years of research and inventive effort as above stated and the new result achieved has opened up an entirely new field of commercial steam and gas metering. Innumerable small plants require accurate knowledge of the quantity of steam used in process work and by various departments. Previously there was no simple, inexpensive, practical quantity of flow meter available which required a minimum of installation and upkeep expense. Such quantity of flow meters of the differential responsive type as existed were individually calibrated and not interchangeable and could not be used with other orifices than originally calibrated for without calibration for each new orifice. In the preferred embodiment, the minimum cost and maximum convenience of installation is achieved by having the entire meter self-contained, combining the differential producing orifice and the differential responsive rotor with attached damping means, counter and gearing into a single compact unit. While hydraulic damping means has preferably been used, any damping means in which the damping force varies as the square of the rotor speed may obviously be used.

A further object of my invention is to provide a means stronger than any hitherto employed for attaching an orifice such as a chord orifice within a main line and thus prevent inaccuracies due to orifice deformation. To this end, I detachably secure a supporting block with the main line from without and I also detachably secure an obstruction plate to the supporting block. In order to provide greater strength, however, so that all the force exerted on the obstruction plate will not bear directly on the block, I preferably provide an eccentric peripheral shoulder on the inner periphery of the main line preferably so as to have the lower portion thereof substantially coincident with the periphery of the main line so that when the obstruction plate is attached to the supporting block, it will not only be supported by the block but also will abut the shoulder.

A further object of my invention is to provide in a device of this description a spring supporting jewel bearing for use in supporting the turbine shaft with a minimum amount of friction.

A further object of my invention is to provide the turbine with an odd number of blades and to provide an even number of nozzles so that there will always be a blade over each nozzle so as to equalize the torque acting on the rotor at all times and to thus decrease the errors due to the pulsating torque resulting from a pulsating flow on the turbine and to increase the steadiness of torque at low rates.

A further object of my invention is to provide a combined meter capable of indicating jointly both rate of flow and quantity of flow, each preferably through the same differential so that both the rate and quantity of flow may be indicated directly without integration from the rate of flow indication. In my preferred embodiment, the differential responsive quantity of flow indicating unit has a range of 15 to 1 and as I operate the rate of flow indicating means directly from the differential I am enabled to employ a relatively light and inexpensive rate of flow indicating means as it never has to be overloaded to work an involved integrating mechanism to integrate rate of flow into quantity. It is apparent that in use both the quantity of flow indicating means and the rate of flow indicating means will independently and continuously check the accuracy of the other.

These and such other objects of my invention as may hereinafter appear will be best understood from a description of the embodiments thereof shown in the accompanying drawings.

In the drawings, Fig. 1 is a longitudinal sectional view of a shunt metering device employing the principles of my invention attached to a main conduit.

Fig. 4 is a vertical sectional view taken through the damping chamber, while

Figure 1:
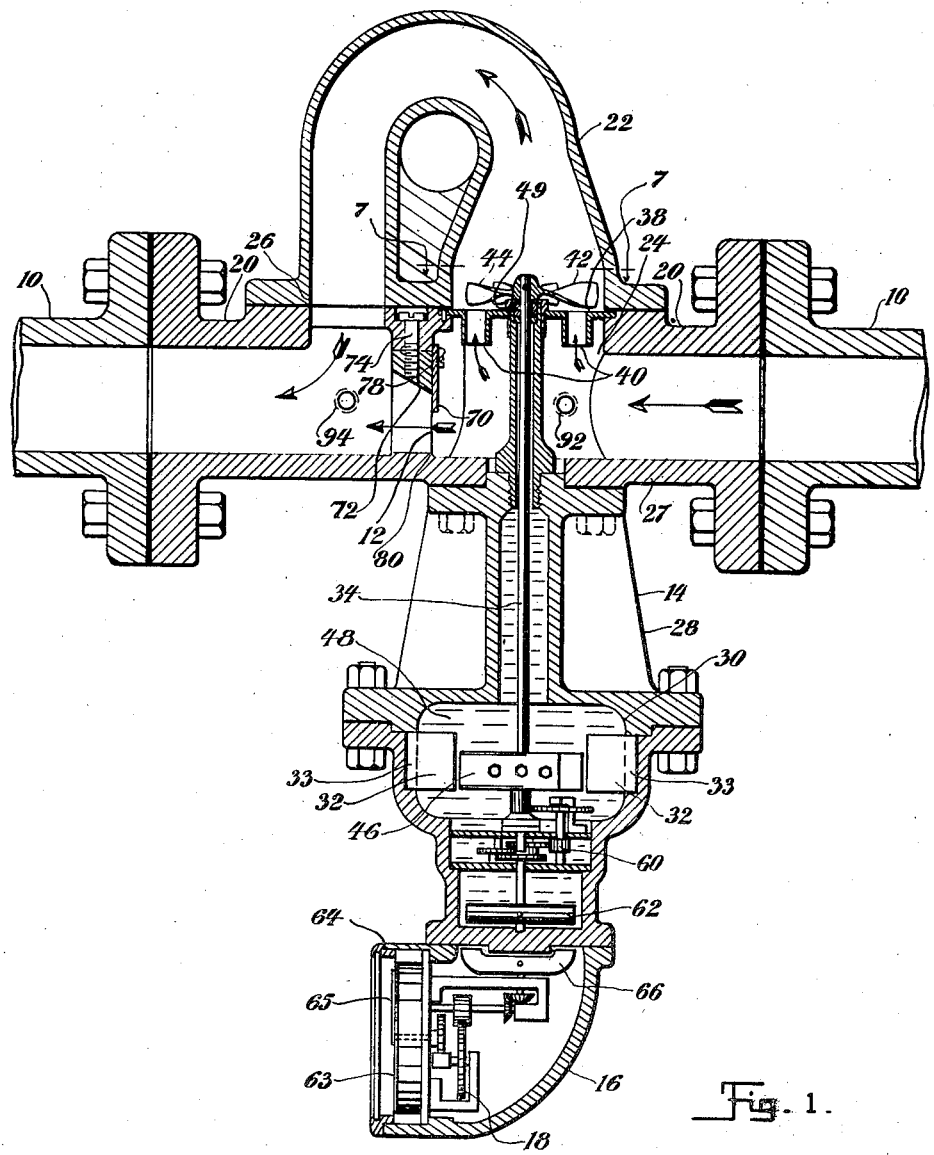
Figure 6:
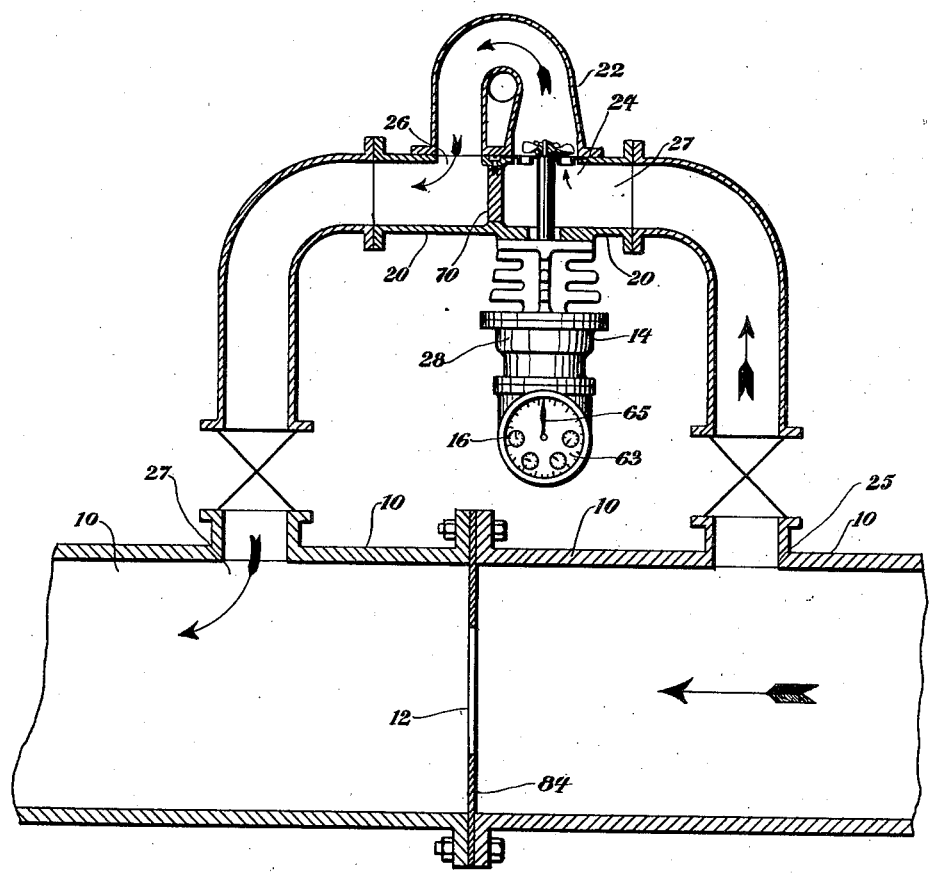
Fig. 6 is a longitudinal partially sectional view of my improved metering device adapted for use on relatively large conduit with the differential producing orifice located between the shunt points of jointure of the metering device to the main line and with a complete obstruction of the main line of the metering device.

In the drawings, wherein like characters of reference indicate like parts throughout, 10 generally indicates a main conduit to which my invention is adapted to be attached either by being directly interposed therein as shown in Fig. 1, or to be attached in shunt thereto as shown in Fig. 6. My preferred embodiment of metering device comprises a pressure differential responsive mechanism 14 and an indicating means 16 having the replaceable sets of gearing 18 therein. As stated, a main feature of my invention consists in providing a standardized differential responsive mechanism 14 which may be attached to conduits of different size and from which the proper differential producing means 12 may be readily calculated for any given flow conditions and for which the proper gearing 18 may also be readily calculated for any given flow conditions so that the entire meter may be attached to the conduit with the proper differential producing means and gearing installed through the use of calculation alone and without the necessity of calibration by tests of the meter. As stated, hitherto, I believe I am the first to provide a quantity of flow manometer having a rotatable element which may be attached to a conduit to indicate directly the quantity of flow passing through the meter without the necessity of any calibration thereof in attached position. I am enabled to do this by constructing the differential responsive mechanism 14 of such a standard size and shape that it may be readily reproduced.

Although I have shown my differential responsive mechanism 14 attached to a shunt line across the main conduit 10 it is apparent that particularly if the device be used for small flows, the entire flow may be directed through the turbine instead of having the shunt flow only through the turbine as shown herein. My entire metering device comprises a main metering line 20, a shunt line 22 connected thereto and the differential responsive element 14 attached to said main line so as to have the turbine thereof revolve within the shunt line and the differential producing means 12 attached to the main line 20 of the meter between the inlet 24 and the outlet 26 of the shunt line. The rotary differential responsive mechanism 14 proper includes the casing 27 adapted to be attached to the conduit and the damping casing 28 having the damping chamber 30 therein attached to said casing attachable portion 27, said damping chamber 30 having the accurately finished fins 32 projecting inwardly of the side wall thereof. I preferably detachably secure the accurately finished fins 32 in suitable machine grooves 33 in the side wall of the casing. The turbine shaft 34 extends through the damping chamber 30 and conduit attachable casing 27. An obstruction 38 extends across the conduit attachable casing 27 having the turbine shaft and preferably an even number, preferably two of diametrically opposed nozzles 40 extending therethrough. Although simple orifice nozzles may be employed, I preferably employ the nozzle tubes 40 as shown in the drawings. The turbine 42 is attached to the shaft 34 downstream of said obstruction in my preferred embodiment within the shunt line 22, and preferably has an odd number of blades 44, preferably twisted as shown. The damping vane 46 is attached to said turbine shaft 34 in the damping chamber 30 opposite the fins 32. In my preferred standardized form of differential responsive mechanism adapted for use on 2", 3" and 4" conduits in which the ratio length/bore of the nozzles is between 2.1 and 4.0, the total nozzle area is between 0.01 and 0.25 of the conduit area and the total nozzle area is between 0.02 and 0.16 of the turbine area, the R. P. M. of the turbine are between 25 and 65 for 1" water differential, the diameter of the damping chamber is between 3"-6", the ratio of damping vane's width/radius is between 0.22 and 0.50, the damping fins project into the damping casing between 0.10 and 0.20 of the damping chamber diameter and the clearance between the damping vane and fins is between 0.05 and 0.15 of the damping vane radius.

As stated hitherto, I have found that if the differential responsive mechanism is constructed of such a standardized size and shape, as above stated, it will be readily reproduceable and the turbine thereof will rotate accurately for any flow conditions to provide a quantity flow manometer as accurate as a standard mercury U-tube rate of flow manometer. The damping liquid 48 shown in the damping chamber 30 consists of water admitted through the upper bearing 49 of the turbine shaft 34 by condensation of steam. If the meter is not used to meter steam, other damping fluids may be employed.

Figure 3:
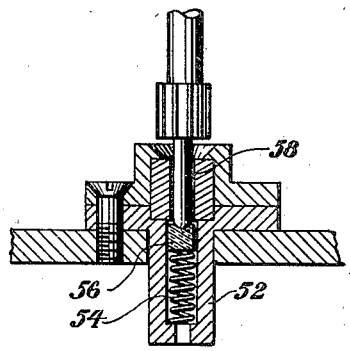
Fig. 3 is a detailed sectional view of a means I preferably employ for mounting the base of the turbine shaft.
Figure 5:
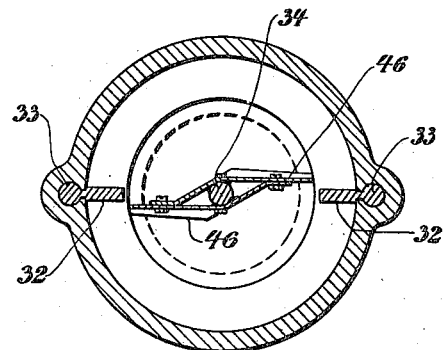
Fig. 5 is a cross sectional view thereof taken along the line 5—5 of Fig. 4.
Figure 4:
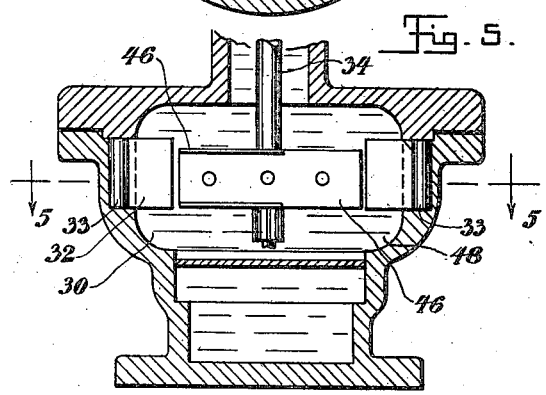
Figure 2:
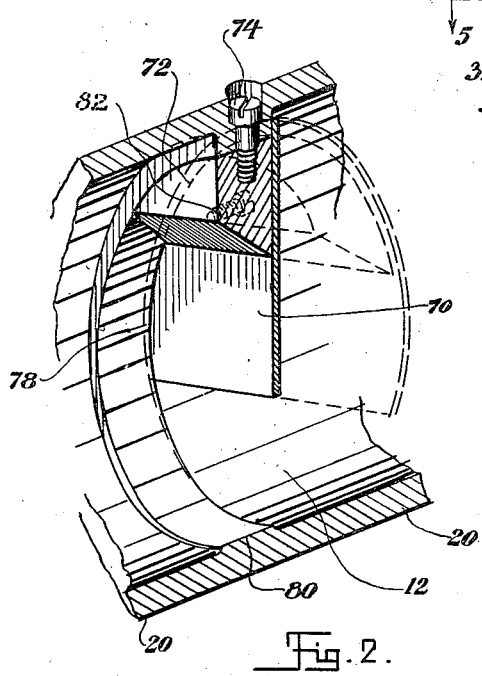
Fig. 2 is a perspective longitudinal sectional view taken from the downstream end of the obstruction between the terminals of the shunt line.

As shown in Fig. 3 I preferably provide the well 52 in the base of the damping chamber 30 in which the spring 54 is loosely mounted and I mount on top of said spring the sapphire or other jewel bearing 56 on which the lower end 58 of the turbine shaft 34 may rest for substantially frictionless support thereof therein.

Figure 7:
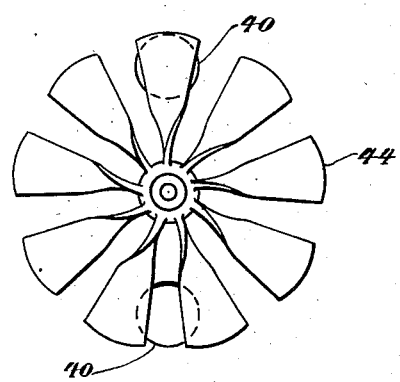
Fig. 7 is a partially diagramatic plan view taken along the line 7—7 of Fig. 1 above the turbine.

As shown more particularly in Fig. 7 I preferably provide an even number of evenly spaced nozzles and an odd number of evenly spaced turbine blades 44 so that there will always be a turbine blade over each nozzle 40 to make uniform the torque exerted by the turbine blades. Thus the minimum amount of error is produced by pressure or flow pulsations.

As stated, I also provide indicating means 16 and suitable means to transmit the rotation of the turbine shaft 34 to the indicating means 16, thus in my preferred embodiment I provide the gearing 60 which leads down to the leading element 62 of the magnetic clutch in the base of the damping casing 28. The indicating means 16 consists of a suitable dial 63 mounted in the dial casing 64 which also contains the following element 66 of the magnetic clutch so that rotation of the leading element 62 thereof will cause a corresponding rotation of the following element 66. Movement is transmitted from the following element 66 of the magnetic clutch to the dial hand 65 through the gearing 18, which as stated, may be readily substituted for other gearing for different flow conditions.

Figure 9:
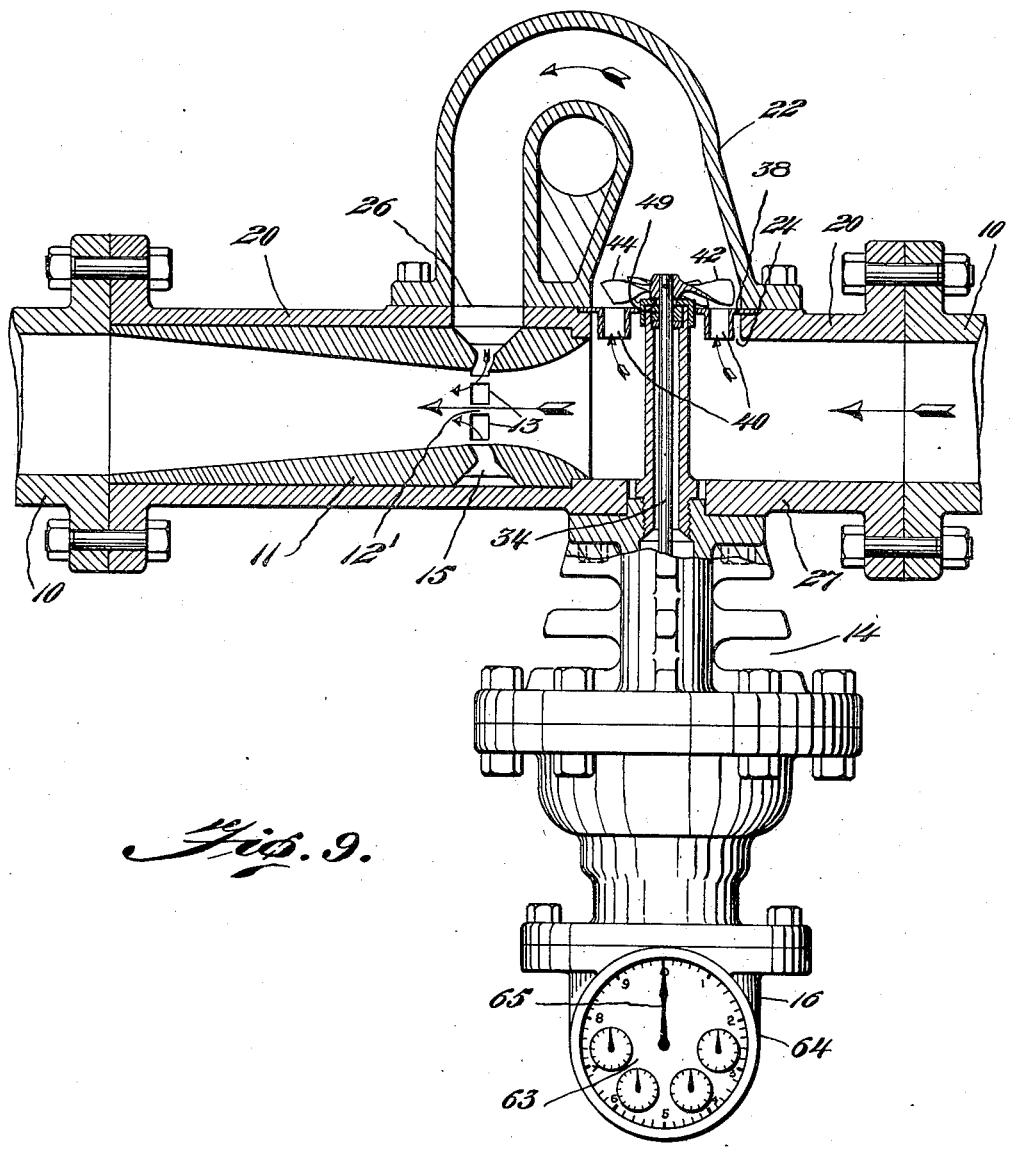
Fig. 9 is a side elevation partially shown in section of an embodiment of my invention similar to that shown in Fig. 1 employed in place of an orifice as the differential producing means thereof a Venturi meter tube.

In order to produce the desired differential in the main line between the terminals of the shunt line, I preferably provide an obstruction 70, in the main line between the terminals 24 and 26 of the shunt line, which of itself may be replaceable for other obstructions so as to provide a standard differential producing means for any given flow conditions suitable for use with the standardized differential responsive mechanism 14. The differential produced by the orifice 12 is slightly affected by the relatively small shunt flow through the nozzles. This is corrected for by simply adding the relatively small effective area of these nozzles 40 to the effective area of the orifice 12 in calculating the effective characteristics of the orifice employed. It is apparent, however, that the orifice 12 which functions as a differential producing means may consist of other forms than the chord orifice shown in the preferred embodiment shown in Fig. 1 and may form the throat 12' of the replaceable Venturi meter tube 11 shown in Fig. 9 detachably securable within the main line 20 of the meter. The throat 12' of the Venturi meter tube as shown in Fig. 9 has the series of circumferentially spaced holes 13 therein discharging radially into the annulus 15, which in turn is connected to the outlet 26 of the shunt tube 22.

The entire flow may be passed through the nozzles by simply completely closing the orifice 12, in which case the nozzles 40 act as the sole pressure differential producing means as shown in Fig. 6.

If in addition, the obstruction plate 38 containing the nozzles 40 be removed, the turbine blades 42 will themselves act to produce a differential. The differential producing means in my improved embodiment of meter comprises the obstruction 70 of the desired size calculated as previously explained for any desired flow condition interposed in the main line between the terminals 24 and 26 of the shunt line 22.

In order to firmly secure the obstruction plate 70 within the main line I detachably secure the supporting block 72 to the inner periphery of the main line preferably by means of the bolt 74 attachable from the outside of the line. The obstruction plate may be of any desired shape, curved, or otherwise and in my preferred embodiment comprises the segmental plate 70 thus partially closing the main line to form the chord orifice opening 12 of desired calculated size therein. In order to more firmly secure the plate 70 within the main line, I form the shoulder 78 preferably a peripheral shoulder on the main line preferably eccentric with the center line of the main line so as to have the lower portion 80 thereof substantially coincident with or tangent to a point on the lower portion of the inner surface of the main line. The obstruction plate 70 is then attached to the upstream surface of the supporting block 72 by means of the screws 82 and is thus supported not only by the supporting block 72 but also by the shoulder 78, the flow of the stream pressing the plate 70 against the shoulder 78 to prevent appreciable deformation of the relatively thin orifice plate 70 normally employed and consequent error due to this cause.

Where it is desired to attach my standardized improved metering device including the standardized differential responsive mechanism 14 to a line over 10" in diameter or under if desired as shown in Fig. 6, I preferably attach the whole metering device in shunt to the conduit 10, and plug up the portion of the main line 20 of the meter between the terminals 24 and 26 of the shunt line 22 by carrying the obstruction plate 70 entirely across the main line and create a suitable pressure differential in the metering device by inserting the calculated orifice plate 84 in the conduit 10 between the inlet and outlet terminals 25 and 27 of the main line of my metering device connected in shunt thereto.

As previously pointed out, inasmuch as I provide a quantity of flow meter actuated by a pressure differential, it may be desirable that I attach thereto a rate of flow indicating means also actuated by the same pressure differential. I have shown a suitable type of combined rate of flow and quantity of flow meter in Fig. 8. In order to attach the rate of flow indicating means 90 to my preferred embodiment of differential responsive quantity of flow meter shown in Fig. 1, I provide the pressure connections 92 and 94 in the sides of the conduit attachable portion of the casing 27 preferably at substantially the same distances from the orifice 12 as the corresponding terminals 24 and 26 of the shunt line. Steam condensing chambers 96 and 98 respectively are attached to these openings 92 and 94 and are filled with water by steam condensation. The true differential pressure is transmitted by the respective pressure pipes 100 and 102 to the upper ends of the legs of the U-tube 103. These lines contain valves 104 and 106 respectively and are filled with water. Between the legs 105 and 107 of the U-tube a bypass valve 108 is inserted which with valves 104 and 106 may be used for zero adjustment of the pen arm 116. The U-tube 103 contains mercury 110 with water above it. In the leg 105 of the U-tube is a float 112 resting on the mercury. Through a simple link mechanism 114 and pen arm 116, a record is made on the chart 118 driven by the clock 120. Since this record is only for the purpose of recording the rate of flow and since the quantity measurement does not depend on the accuracy of the rate record (as it does with the usual differential responsive flow meter) a comparatively inexpensive and simple mechanism is satisfactory. This combined rate and quantity meter covers an extremely wide field of use since both the rate indicating and quantity indicating means are each direct as they do not involve any complicated steps such as integration from the rate to obtain the quantity. It is desirable to graduate the chart on the rate indicating means 90 to a decimal scale and merely use the proper constant for whatever differential producing means and line conditions obtain. Both the rate and quantity indications then have the same corrections for changes in line conditions from those for which the instruments have been calculated. Upon changing the line conditions, the same simple correction thus may be made to both the rate and quantity indications.

The indication of the quantity meter depends only upon the differential and not on the density of the fluid metered. This quantity meter is not a shunt meter in which the indication is proportionate only to the velocity but is truly a differential responsive mechanism. It is by the use of the liquid damped rotor that a common correction for both differential responsive mechanisms for rate and quantity is attained.

Figure 8:
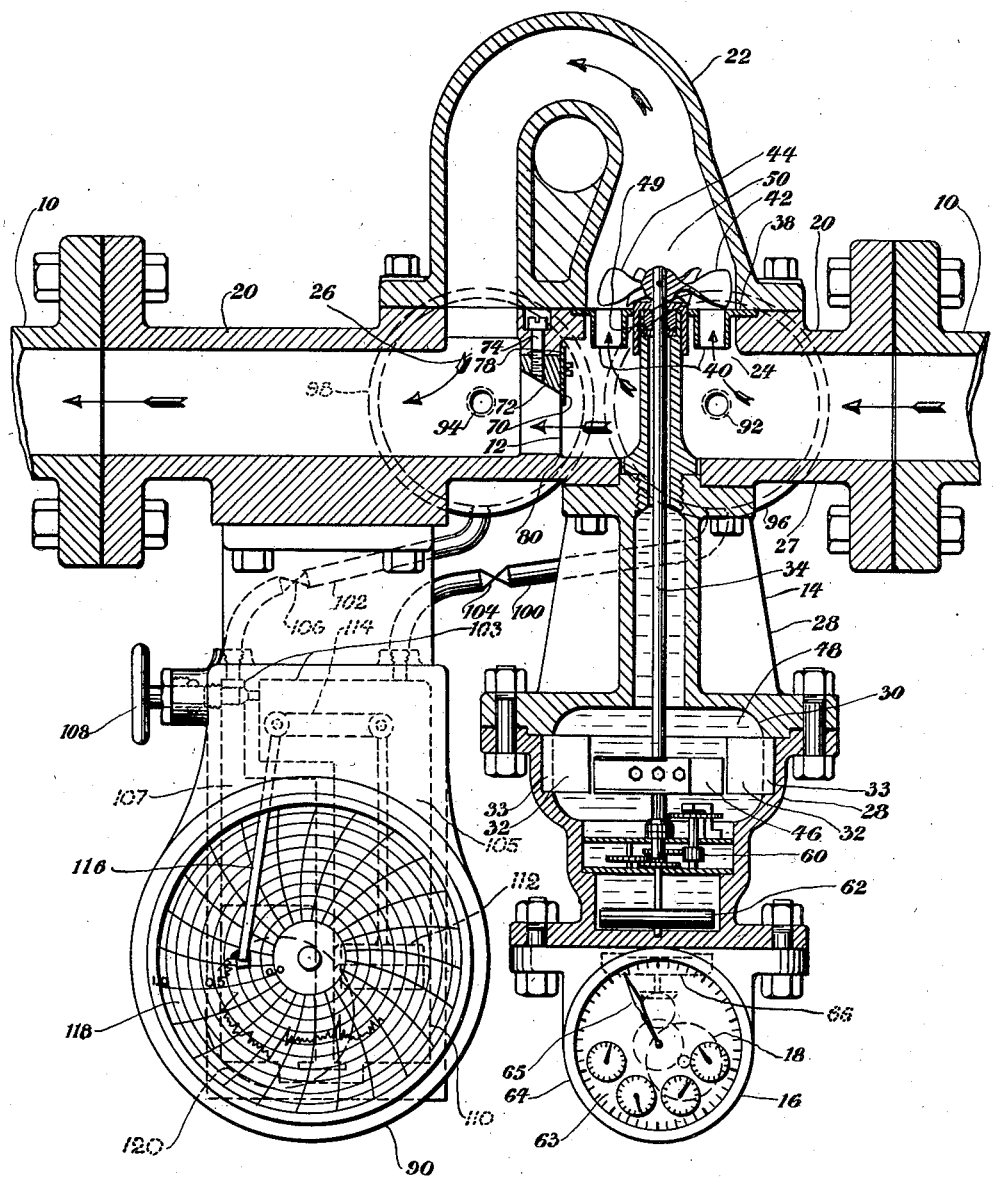
Fig. 8 is a side elevation partially shown in longitudinal section of a suitable rate of flow manometer attached to the embodiment of my invention shown in Fig. 1 to provide a combined rate of flow and quantity of flow meter.

The operation of a typical combined rate and quantity of flow meter for steam such as shown in Fig. 8 is as follows: the steam flows down through the conduit 10 and through the differential producing means in the casing 20 and flowing through the orifice 12 attached to the main line creates a differential pressure. The terminals 24 and 26 of the shunt line 22 transmit this difference of pressure to the nozzles 40 in the obstruction plate 38 downstream of the upstream terminal 24. This differential pressure causes flow through the nozzles 40, which flow is very small and does not substantially affect the pressure transmitted to the shunt line 22. The streams from the nozzles 40 impact the relatively slowly moving rotor turbine 42 with a force which is proportional only to the differential pressure, i. e., substantially independent of changes in density produced by pressure or temperature variations. The turbine 42 will then revolve at that speed at which the braking force of the vane 46 in the water damping chamber 30 is equal to the impact force of the streams from the nozzles 40 upon the turbine 42. Since both forces vary as the square of the revolutions of the rotor it is apparent that the rotor 42 will revolve at a rate proportionate to the square root of the differential $\sqrt{D}$. The revolutions of this rotor 42 are transmitted through reducing gearing 60 to the magnetic clutch elements 62 and 66 which transmit the motion to the change gearing 18 below the damping chamber. This gearing 18 drives the dial hand 65 so that it indicates directly the quantity of flow on the dial 63.

In the embodiment shown in Fig. 8, the rate indicating means will simultaneously function with the quantity of flow indicating means in the well known manner of functioning of differential responsive rate of flow indicating means.

As the pressure connections 92 and 94 are spaced at substantially the same distances from the orifice 12 as the corresponding terminals 24 and 26 of the shunt line, it is obvious that they will transmit to the rate of flow indicating means 90 in the same manner as the shunt line terminals 24 and 26 transmit to the turbine 42, the differential produced by the orifice 12. In a manner well-known for rate of flow indicating means, the pressures in the line at 92 and 94 are transmitted respectively through the pipes 100 and 102 to the legs 105 and 107 of the U-tube 103 causing a difference in the level of the mercury 110 in the said U-tube, which difference is transmitted through the medium of the float 112 and link mechanism 114 to the pen arm 116 which indicates the rate of flow on the revolving chart 118.

With a given size of main and given conditions of the fluid flow in the conduit it is only necessary to calculate the proper orifice size and gear ratio for the standardized quantity of flow meters shown in my preferred embodiment, as follows: The safe maximum working differential D for the meter is known and also the maximum rate of flow W as well as the density G of the fluid to be measured in the conduit. The effective area A of the combined orifice 12 and nozzles 40 required for this flow is easily calculated from formula 1 shown below as for any differential rate meter.

By my invention I standardize and make constant the relation K between the rate of revolution of the rotatable element and the square root of the differential $\sqrt{D}$ for my improved rotary quantity flow meter. From this relation expressed in formula 3 the maximum rotor speed R corresponding to the maximum differential D may readily be calculated employing this known constant K. The required reading is obviously the maximum quantity W which it is desired to measure and for which the orifice size has been determined at the maximum differential. The proper gear ratio to make the counter read correctly is then merely the ratio between the rotor speed R and the desired counter speed W. This simple method of calculation has been proved suitable and accurate. This method of calculation is expressed in formula 2 shown below which shows the relation existing between the rate of flow W and the rotor speed R for an orifice of area A and fluid having a density G, the constant K being standard. The well known constant 457 depends on fundamental physical laws. Where a rate of flow recording mechanism is attached, the rate scale is decimally graduated from zero to unity and it is only necessary to multiply the readings of the chart by the maximum rate corresponding to the orifice, in other words, the only calculation necessary is that for determining the proper size of orifice. Since the same maximum differential is used for both the rate and quantity meter, the one calculation of orifice size covers both meters. This is an extremely simple and yet accurate method of determining sizes and constants for this meter.

The following formulas apply:

1. $W = 457\, A\sqrt{D}\sqrt{G}$
2. $W = 457\, AKR\sqrt{G}$
3. since $\sqrt{D} = KR$.

Where

W pounds/hour _____ rate of flow
457 _____ a constant
A inches² _____ effective area of combined orifice and nozzles
G pounds/foot³ _____ density of fluid at rotor
D inches _____ differential of a water manometer
R revolutions/hour _____ rotor speed
K _____ a constant I employ the words "indicating means" or "manometer" in the claims to include a means which will indicate or record jointly or severally.

It is understood that my invention is not limited to the specific embodiments shown or method described and that various deviations may be made therefrom without departing from the spirit and scope of the appended claims.

What I claim is:

1. In a turbine meter containing pressure differential producing means in which the differential produced varies is a known manner with the rate of flow, a differential responsive mechanism actuated thereby comprising a turbine having inclined blades adapted to be actuated by axial flow, damping means for said turbine and nozzle means interposed in said meter axially upstream of said turbine to impinge the flow at the desired angle on said turbine to rotate said turbine, the blades of said turbine being fixed and of such a non-multiple number and spacing in relation to said nozzles as to produce a substantially uniform torque on said turbines.

2. A differential responsive mechanism for use in quantity of flow meters adapted to be attached to a conduit including a casing adapted to be attached to the conduit and an accurately finished damping casing having a damping chamber having accurately finished fins projecting inwardly from the side wall thereof, a turbine shaft extending through the damping casing and conduit attachable casing, an obstruction extending across said conduit attachable casing having said turbine shaft and nozzle tubes extending axially therethrough, a turbine attached to said shaft downstream of said obstruction and having fixed inclined blades adapted to be actuated by axial flow of such non-multiple number and spacing in relation to said nozzles as to produce a substantially uniform torque on said shaft and a damping vane attached to said turbine shaft in the damping chamber opposite said fins.

3. A rotary differential responsive mechanism for use in quantity of flow meters adapted to be attached to a conduit, including a casing adopted to be attached to a conduit and an accurately finished damping casing having a damping chamber having accurately finished fins projecting inwardly of the side wall thereof, a turbine shaft extending through the damping casing and conduit attachable casing, a turbine attached to said shaft and having a number of twisted blades and a damping vane attached to said turbine shaft in the damping chamber opposite said fins, said meter being adapted for use on 2″–4″ conduits, and in which mechanism the R. P. M. of the turbine are between 25 and 65 for 1″ water differential, the diameter of the damping chamber is between 3″–6″, the ratio of damping vane's width radius is between 0.22 and 0.50, the damping fins project into the damping casing between 0.10 and 0.20 of the damping chamber diameter and the clearance between the damping vane and fins is between 0.05 and 0.15 of the damping vane radius.

4. A rotary differential responsive mechanism for use in quantity of flow meters adapted to be attached to a conduit and having nozzles therein and an accurately finished damping casing having a damping chamber having accurately finished fins projecting inwardly of the side wall thereof, a turbine shaft extending through the damping casing and conduit attachable casing, a turbine attached to said shaft downstream of said nozzles and having a number of twisted blades and a damping vane attached to said turbine shaft in the damping chamber opposite said fins, said meter being adapted for use on 2″–4″ conduits and in which mechanism the ratio of length/bore of the nozzles is between 2.1 and 4.0, the total nozzle cross-sectional area is between 0.01 and 0.25 of the conduit cross sectional area and the total nozzle cross sectional area is between 0.02 and 0.16 of the turbine cross sectional area, the R. P. M. of the turbine are between 25 and 65 for 1″ water differential, the ratio of damping vane's width/radius is between 0.22 and 0.50, the damping fins project into the damping casing between 0.10 and 0.20 of the damping chamber diameter and the clearance between the damping vane and fins is between 0.05 and 0.15 of the damping vane radius.

5. In a pipe line construction, a main line, a shunt line connected thereto, a peripheral shoulder formed on the inner periphery of the main line between the terminals of the shunt line, a supporting block attachable to said shoulder and an obstruction plate attachable to the upstream face of said supporting block to have a portion thereof abutting said supporting block and a portion thereof abutting said shoulder.

6. In a pipe line construction, a main line, a shunt line connected thereto, a peripheral shoulder formed on the inner periphery of the main line between the terminals of the shunt line eccentric with the center line of said main line so as to have a portion thereof substantially coinincident with the periphery of the main line, a supporting block attachable to said shoulder and an obstruction plate attachable to the upstream end of said supporting block to have a portion thereof abutting said supporting block and a portion thereof abutting said shoulder.

In testimony whereof I affix my signature.

JOHN LAWRENCE HODGSON.